UNITED STATES PATENT OFFICE.

HEINZ BUER, OF COLOGNE, GERMANY.

PROCESS OF OBTAINING TASTELESS AND INODOROUS LECITHIN.

1,055,514. Specification of Letters Patent. Patented Mar. 11, 1913.

No Drawing. Application filed June 21, 1912. Serial No. 705,123.

*To all whom it may concern:*

Be it known that I, HEINZ BUER, a subject of the King of Prussia, and resident at Cologne, in the Province of Rhine, Kingdom of Prussia, German Empire, have invented certain new and useful Processes of Obtaining Tasteless and Inodorous Lecithin, of which the following is a specification.

As is well known, the lecithin hitherto introduced into commerce both of animal and vegetable origin possesses a strongly distinctive taste and smell. On the other hand, the pure undecomposed lecithin in yolk of egg is naturally tasteless; for in fresh yolk of egg (which as is well known contains 9% to 10% of lecithin) it is not possible to recognize it by the taste, in spite of the relatively high percentage, while, on the other hand mixtures of separated pure lecithin with other materials even when they possess a smaller percentage of lecithin than that in yolk of egg, permit the distinctive flavor of lecithin possessed by pure lecithin to be recognized. By the present process it becomes possible to obtain an almost completely and inodorous lecithin, both from animal as also from vegetable materials containing lecithin. The previous processes for the obtaining of pure lecithin have in common the treatment of the raw material by boiling solvents, for instance boiling with alcohol or acetic ether, also the evaporation of the lecithin in a vacuum or any other suitable drying apparatus with the application of higher temperatures of about 60° to 80° centigrade. In all known processes the operation is therefore carried out by the application of heat and at temperatures from 60° to 80° centigrade, either in the extraction and evaporation of the extracts or in the drying of the lecithin. In contra-distinction to this the present process is characterized by the feature that both during the extracting of the lecithin containing substances, and also during the precipitation of the lecithin, there is no heating of either of the raw material or of the salt, and also the drying of the lecithin is effected at a temperature of below 30° centigrade. The lecithin is a substance which easily decomposes even on the application of temperatures of more than 30° centigrade. It is precisely these decomposed products which give the lecithin hitherto brought into commerce this peculiar, undesirable taste and smell.

According to the present process, the well-dried, finely powdered raw material containing lecithin is treated for a prolonged period with cold 96% alcohol as much as possible with constant stirring. The lecithin contained in the raw material is thereby brought into solution because the high percentage of cold alcohol dissolves the lecithin but not fat, differing thus from hot alcohol, at least with the exception of inconsiderable quantities. On sufficient drying and fine sub-division of the raw material and sufficiently long action of the solvent, boiling during the extraction is rendered unnecessary, and it suffices to bring the lecithin contained in the raw material into solution, with the exception of a small residue; this method is moreover of special importance not alone for the quality of the lecithin but also for that of the residual products, thus for instance, the residues of dried yolk of egg are no wise injured by the treatment with cold alcohol, whereas if they are boiled with alcohol they are more or less rendered valueless by the production of decomposed products, so that the albumen and fat contained in them possesses in consequence of the heating only a very slight permanence. On the other hand the residues of the dried yolk of egg, if they have been treated only with cold alcohol possess a good permanence and can therefore be better untilized.

After the treatment with cold alcohol and the obtaining of the extract by filtration, there is then added about from 33% to 35% volumes of a cold aqueous 1% to 2% solution of common salt. This causes the lecithin which is in the extract in solution to separate out, and to appear in a gelatinous layer, principally on the outer surface; the addition of the 1% to 2% solution of salt to the precipitated water causes a separation of the lecithin to take place more quickly. The evaporating and therefore the heating of the extract as is usual for the purpose of separating the lecithin hitherto, is therefore naturally avoided according to this process. The precipitation of the lecithin does not however take place, from the extract when a small quantity of cold water be added, say from 10% to 15% by volume; even after standing for days there is then no separation of lecithin.

The precipitation of the lecithin from the alcoholic extract by addition to the above solution of common salt is much more advantageous than the evaporation of the extract. Apart from the fact that through the long heating necessary for the evaporation of the extract the nature of the lecithin as well as the taste and smell and durability is injured, this process requires a not inconsiderable consumption of heat and time is therefore also economically less advantageous than the precipitating by the addition of cold water.

After the separation of lecithin the remaining solution, which in the case of extracts of animal matters containing lecithin possesses a small quantity of the dissolved fat and in the case of the treatment of vegetable raw materials possesses also bitter ingredients, this is filtered off. The remaining lecithin is then dried in a vacuum or other suitable drying apparatus at temperatures below 30° centigrade.

Example: 100 kilos dry yolk of egg are extracted with from 500 to 600 liters of cold 96% alcohol for from 24 to 28 hours with constant stirring, the extract thus obtained is then filtered off and mixed at ordinary temperature with from 33% by volume of 1% to 2% solution of common salt. After prolonged standing, there then separates out a gelatinous layer principally on the surface. After the solution has been filtered off, the lecithin is dried in a vacuum or other suitable drying apparatus at a temperature at below 30° centigrade.

Various quantities of lecithin are obtained depending on the kind of raw material used, thus for instance, by using dry yolk of egg there is obtained from 100 kilos some 19 to 20 kilos and by the use of pulse, from 100 kilos from $\frac{3}{4}$ to $1\frac{1}{2}$ kilos of pure lecithin.

What I claim and desire to secure is:

A process for the production of tasteless and odorless lecithin from vegetable and animal raw materials containing lecithin, characterized by the feature, that the finely powdered and dried raw material containing lecithin is extracted with cold 96% alcohol for a prolonged period, preferably with constant agitation; the alcoholic extract thus obtained is mixed with from 33% to 35% by volume of a cold aqueous 1% to 2% solution of common salt, and finally the lecithin which is separated out after prolonged standing is freed from the remaining fats, coloring matters and (in the use of vegetable materials) bitter substances in solution by filtration, and then the lecithin is dried in a vacuum or other suitable drying apparatus at below 30° centigrade.

In testimony, whereof I have signed my name to this specification in the presence of two subscribing witnesses.

HEINZ BUER.

Witnesses:
 Louis Vandory,
 Th. Throoberenc.